(12) United States Patent  
Kimura

(10) Patent No.: US 7,527,772 B2  
(45) Date of Patent: May 5, 2009

(54) ULTRASONIC COUNTER-CURRENT SCREW EXTRACTOR FOR URANIUM RECOVERY AND PROCESS THEREFORE

(75) Inventor: Richard Thaddeus Kimura, Richland, WA (US)

(73) Assignee: AREVA NP Inc., Lynchburg, VA (US)

( * ) Notice: Subject to any disclaimer, the term of this patent is extended or adjusted under 35 U.S.C. 154(b) by 896 days.

(21) Appl. No.: 10/883,073

(22) Filed: Jul. 1, 2004

(65) Prior Publication Data

US 2006/0088457 A1      Apr. 27, 2006

(51) Int. Cl.
*C22B 9/00*      (2006.01)

(52) U.S. Cl. .................. 423/20; 423/4; 423/8; 423/9; 423/10; 366/127

(58) Field of Classification Search .................. 423/20, 423/4, 8–10; 366/127
See application file for complete search history.

(56) References Cited

U.S. PATENT DOCUMENTS

| 3,882,040 | A | 5/1975 | Auge et al. |
| 4,177,241 | A | 12/1979 | Divins et al. |
| 4,980,090 | A | 12/1990 | Manchak |
| 5,098,645 | A | 3/1992 | Forsberg |
| 5,573,738 | A | 11/1996 | Ma et al. |
| 2003/0183043 | A1 | 10/2003 | Wai et al. |

FOREIGN PATENT DOCUMENTS

| EP | 0 644 270 B1 | 6/1999 |
| JP | 2001-133596 | 5/2001 |

OTHER PUBLICATIONS

International Search Report from PCT/US05/19292, mailed Jul. 6, 2006.

*Primary Examiner*—Steven Bos

(57) ABSTRACT

An apparatus and method to remove uranium from a body of material wherein the method includes the steps of depositing the body of solid material in an ultrasonic extractor and depositing an amount of acid in the ultrasonic extractor. The method also provides for the steps of heating a jacket of the ultrasonic extractor, transporting the body of solid material in the ultrasonic extractor and the amount of acid such that the body of solid material and the acid contact each other inside the heated ultrasonic extractor while the ultrasonic extractor provides ultrasonic energy to both the body of solid material and the amount of acid, wherein the amount of acid strips uranium from the body of solid material. The method further provides for collecting the amount of acid and the body of solid material in the ultrasonic extractor in different positions, transporting the amount of acid with the stripped uranium to an extraction mixer settler, and settling uranium product from the extraction mixer settler.

5 Claims, 2 Drawing Sheets

ULTRASONIC COUNTER-CURRENT SCREW EXTRACTOR FOR URANIUM RECOVERY AND PROCESS THEREFORE

FIELD OF THE INVENTION

The present invention relates to a method and device for uranium recovery. More specifically, the present invention provides an apparatus and method for recovering uranium from a body of material using an ultrasonic counter-current screw extractor.

BACKGROUND INFORMATION

Contaminated materials, such as incinerator ash and soils, pose many challenges for the uranium processing industry. At uranium processing sites, incinerator ash and soils may be contaminated with different materials, including heavy metals, uranium and other radioactive materials. Uranium materials, when present in such solids, may be either uniformly distributed throughout the solids or may be concentrated in discrete sections. Removal of uranium materials from these solids is particularly difficult as, in most instances, a non-uniform distribution of uranium at low concentration levels occurs. Material treatment/separation techniques which use a mechanical separation technique (i.e. classifiers) are not equipped to separate uranium at low concentrations and, as a consequence, are not of practical use in these instances. Another drawback of mechanical separation classifiers is that these classifiers use large amounts of energy for the amount of materials separated and are therefore economically unfeasible.

Current systems used to separate uranium from solids are also expensive due to several other economic factors. The solids that are contaminated must be removed (i.e. excavated), trucked to a treatment site, treated, and then returned to the original excavation site for filling. The multiple handling steps for cleaning the solid material increases both the ultimate energy costs associated with treatment as well as the associated labor costs. Handling of contaminated solids also requires special trucking systems to prevent the solids from contaminating the trucking system and the surrounding environment due to leaks in the trucking system.

There is therefore a need to provide a method and apparatus which will allow uranium to be separated from a base solid, such as incinerator ash and/or soils, with greater efficiency than current mechanical separation techniques.

There is a further need to provide an apparatus and method which will allow the uranium to be separated economically from the base solid.

There is a further need to provide an apparatus which is easily transportable so that contaminated materials may be treated on-site, thereby minimizing handling costs.

SUMMARY

It is therefore an objective of the present invention to provide a method and apparatus which will allow uranium to be separated from a base solid, such as incinerator ash and/or soils, with greater efficiency than current mechanical separation techniques.

It is also a further objective of the current invention to provide an apparatus and method which will allow the uranium to be separated economically from the base solid.

It is a still further objective of the current invention to provide an apparatus for treating solids that is easily transportable so that contaminated materials may be treated on-site, thereby minimizing handling costs.

The objectives of the present invention are achieved as illustrated and described. The invention provides a method to remove uranium from a body of solid material. The invention recites the method steps of providing the body of solid material containing a concentration of uranium, depositing the body of solid material in an ultrasonic extractor and depositing an amount of acid in the ultrasonic extractor. The method also provides for the steps of heating a jacket of the ultrasonic extractor, transporting the body of solid material in the ultrasonic extractor and the amount of acid such that the body of solid material and the acid contact each other inside the heated ultrasonic extractor while the ultrasonic extractor provides ultrasonic energy to both the body of solid material and the amount of acid, wherein the amount of acid strips uranium from the body of solid material. The method further provides for collecting the amount of acid and the body of solid material in the ultrasonic extractor in different positions in the ultrasonic extractor, transporting the amount of acid with the stripped uranium to an extraction mixer settler, and settling uranium product from the extraction mixer settler.

The invention also provides for an apparatus to remove uranium from a body of solid material. The invention provides at least one ultrasonic extractor configured to accept the body of solid material at a bottom and an amount of acid at a top, wherein the at least one ultrasonic extractor is configured in a mixing screw arrangement, the ultrasonic extractor configured with at least one ultrasonic unit to impart ultrasonic energy into the body of solid material and the amount of acid while the body of solid material and the amount of acid traverse the at least one ultrasonic extractor and an acid delivery system configured to deliver the amount of acid to the at least one ultrasonic extractor. The invention also provides for a pump configured to remove the amount of acid which has drained to the bottom of the at least one ultrasonic extractor, a feed tank configured to accept the amount of acid removed by the pump and an extraction mixer settler connected to the feed tank, the extraction mixer settler configured to accept material from the feed tank and separate uranium product from a remainder of the amount of acid.

The invention also provides an apparatus for separating uranium from a mass of material. The apparatus provides a combustible waste feed system, a combustion chamber connected to the combustible waste feed system, the combustion chamber configured to combust waste from the waste feed system and a fuel source, a feed tank, a first ultrasonic counter-current screw extractor, a second ultrasonic counter-current screw extractor connected to the first ultrasonic counter-current screw extractor and a third ultrasonic counter-current screw extractor connected to the second ultrasonic counter-current screw extractor. The apparatus also includes a pump connected to the first ultrasonic counter-current screw extractor, the pump configured to remove an amount of acid from the first ultrasonic counter-current screw extractor and provide the amount of acid to the feed tank, an acid delivery system configured to add the amount of acid to the third ultrasonic counter-current screw extractor and remove accumulated acid at a bottom of the third ultrasonic counter-current screw extractor and transport the accumulated acid to a top of the second ultrasonic counter-current screw extractor and transport accumulated acid at a bottom of the second ultrasonic counter-current screw extractor and transport the accumulated acid at the bottom of the second ultrasonic counter-current screw extractor to a top of the first ultrasonic counter-current screw extractor and an extraction mixer settler connected to the feed tank, the extraction mixer settler configured to treat material received from the feed tank in an aqueous phase and an organic phase. The apparatus moreover provides a raffinate treatment system connected to the extraction mixer settler, the raffinate treatment system configured to treat raffinate waste from the extraction mixer settler, an organic phase reconditioning system connected to the extraction mixer settler, the organic phase reconditioning system configured to regenerate an organic phase arrangement of the extraction mixer settler, a process offgas scrubber connected to the feed tank and the extraction mixer settler, the process offgas scrubber configured to process offgas for release, a neutralization system, and a dissolver offgas scrubber connected to the third ultrasonic counter-current screw extractor, the dissolver offgas scrubber configured with an outlet to the process offgas scrubber and the neutralization system, the neutralization system configured to neutralize materials obtained from the dissolver offgas scrubber.

DETAILED DESCRIPTION

Figure 1:
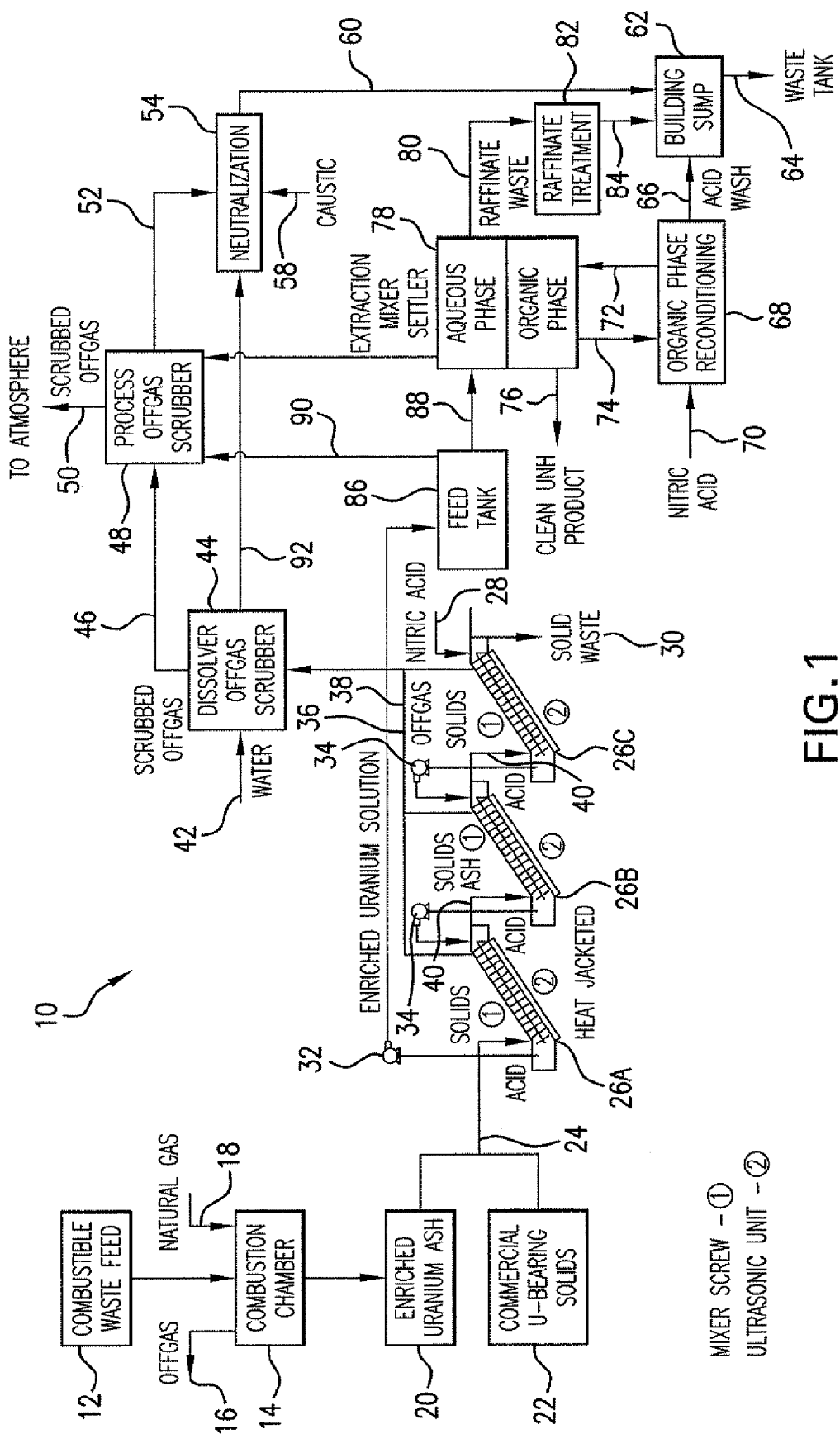
FIG. 1 is a schematic representation of an arrangement using an ultrasonic counter-current screw extractor for uranium recovery from solid materials.

Referring to FIG. 1, an arrangement 10 using an ultrasonic counter-current screw extractor for uranium recovery is illustrated. The arrangement 10 is used to treat solids, such as incinerator ash and/or soils, that are contaminated with uranium. In the arrangement, a combustible waste feed 12 feeds into a combustion chamber 14 of an incinerator for ultimate disposition. The combustion chamber 14 may be fed with an input of natural gas 18, or other combustible power source such as oil as a non-limiting example. Gaseous components resulting from the combustion process in the combustion chamber 14 are released from the combustion chamber 14 by an offgas outlet 16 which, as illustrated, releases the gaseous components generated in the combustion chamber 14 to the atmosphere. Although not illustrated, further processing steps may occur for the offgas exiting the combustion chamber in order to reduce the ultimate amount of pollutants discharged to the atmosphere. Such treatment steps may be, for example, selective non-catalytic reduction, urea injection as non-limiting treatments available.

The resulting solid uranium containing component derived from the combustion process in the combustion chamber 14 is a uranium bearing ash 20 as the volatile and combustible materials have been removed in the combustion chamber 14 by the combustion process. The concentration of the uranium in the ash exiting the combustion chamber 14 may vary according to the amount of uranium concentration originally added to the combustion chamber 14. The combustible waste feed 12, for example, may contain a greater or lesser uranium component and as a result, the resulting ash may have a varying concentration of uranium.

Commercial uranium bearing solids 22 may be added separately or blended with the uranium ash 20 exiting the combustion chamber 14 thereby producing a uranium bearing solid 24 which may be separated into a uranium component and a non-uranium bearing component. The solid form of the material may be discrete particles of material, such as fine powder or uranium bearing solids. The uranium bearing solid 24 may be fed into a first unit 26A of an ultrasonic counter-current screw extractor for uranium recovery 26. The uranium bearing solid 24 may be placed in a bottom of an ultrasonic unit 26A which is configured to accept solid materials and transport these materials from the bottom of the unit 26A to the top of the unit 26A. As illustrated, the ultrasonic units 26A,B,C may be mixer screw arrangements 26 which provide a height change of the solids entering the bottom of the units 26A,B,C. At the top of the ultrasonic units 26A,B,C, acid may be added to the unit 26A,B,C to allow the uranium to be accurately separated from the non-uranium solids in the uranium bearing solid 24. As illustrated, three individual ultrasonic units 26A,B,C may be used in series to separate uranium from the remainder of the solids 24. Each ultrasonic unit 26A,B,C may have a separate pump 34 which places an acid in a top of the ultrasonic unit 26A,B,C. The acid added may be, for example, a nitric acid, as a non-limiting example, for stripping the uranium content from the solids 24. The acid addition to each ultrasonic unit 26A,B,C may be from the discharge of any previous ultrasonic unit, thereby minimizing the amount of nitric acid used as well as providing a superior uranium separation capability. The addition of acid to each ultrasonic unit may be staged such that low concentration uranium solids contact acid which is more concentrated so that uranium may be removed with a greater efficiency. Additionally, acid which is not as concentrated (i.e. acid that has been used in a previous step or uranium stripping) may be combined with greater uranium bearing solids. In this manner, an optimal acid concentration is maintained in contact with the solids 24 throughout processing, thereby allowing minimal acid use while maximizing uranium stripping capability. The number of ultrasonic units may vary in order to optimize uranium recovery. The equipment may also be sized to ensure criticality safety, relying upon safe geometry.

Each of the ultrasonic units 26 may be configured to have a jacket (i.e. an outer covering) that heats the unit 26 and the materials placed in the interior of the ultrasonic unit 26. The heating of the jacket and the interior placed materials may be accomplished through electric heating or through creation of a steam jacket. Other heating mechanisms may be used, and the heating types are to be considered illustrative and non-limiting.

In the example embodiment illustrated, a first ultrasonic unit 26A accepts a combination of enriched U ash and commercial uranium bearing solids 24. This combination of solids 24 is added to the bottom of the first ultrasonic unit 26A and subsequently heated by the jacket as the solids traverse up the first ultrasonic unit 26A. The material placed in the bottom of the ultrasonic unit 26A is combined with nitric acid added by pump 40, wherein the nitric acid enters the top of the ultrasonic unit 26A and flows down the unit 26A. The nitric acid added by the pump 40 is obtained from a second ultrasonic unit 26B preceding the first ultrasonic unit 26A.

The material exiting the first ultrasonic unit 26A enters an ultrasonic discharge 40 which transports the material from the first ultrasonic unit 26A to a second ultrasonic unit 26B. The material transported by the ultrasonic discharge 40 enters the bottom of the second ultrasonic unit 26B and transfers up through the second ultrasonic unit 26B. The material is again heated by a jacket of unit 26B. Simultaneous to the transfer of the material from the first ultrasonic unit 26A to the second ultrasonic unit 26B, nitric acid obtained from a third ultrasonic unit 26C is pumped to the top of the second ultrasonic unit 26B. The solids entering the second ultrasonic unit 26B contact the nitric acid from the third ultrasonic unit 26C within the heated interior of the second ultrasonic unit 26B. The solids from the second ultrasonic unit 26B exit the top of the second ultrasonic unit 26B and enter the bottom of the third ultrasonic unit 26C. A nitric acid solution is added to the top of the third ultrasonic unit 26C. As the solids entering the bottom of the third ultrasonic unit 26C traverse up the third ultrasonic unit 26C, they contact the added nitric acid solution traversing down the third ultrasonic unit 26C. The solid material exiting the third ultrasonic unit 30 may be disposed of as solid waste 30.

The nitric acid exiting the first ultrasonic unit 26A may be gathered by a pump 32 and sent to a feed tank 86 which collects the gathered nitric acid from the ultrasonic counter-current screw extractors 26A,B,C. The feed tank 86 may be any size tank to accept the total flow of nitric acid transferred from the ultrasonic units 26A,B,C. The feed tank 86 has two outlets, a first outlet for gaseous material and a second outlet for aqueous material. The first outlet for gaseous material exits the feed tank 86 and goes to a process off-gas scrubber 48. The second outlet for aqueous material 88 goes to an extraction mixer settler 78 which has both an aqueous phase and organic phase component. The aqueous phase component has an outlet for raffinate waste 80 which proceeds to a raffinate treatment system 82. An outlet for the raffinate treatment system may proceed to a building sump 62, for example, or another storage facility. The building sump 62 may then empty into a waste tank 62 for disposal. The organic phase of the extraction mixer settler 78 may have an outlet 74 which enters an organic phase reconditioning system 68. The organic phase reconditioning system 68 may also have an inlet for nitric acid 70 to aid in the reconditioning. The organic phase reconditioning system 68 may also have a return line 72 allowing organic phase constituents to be returned to the extraction mixer settler 78. Clean uranium product 76 may be recovered from the extraction mixer settler 78 after treatment of the organic phase components. The organic phase reconditioning system 68 may have an outlet for an acid wash 66 which also enters the building sump 62.

The third ultrasonic counter-current screw extractor for uranium recovery 26C may also have an outlet for a dissolver offgas scrubber 44. The dissolver offgas scrubber 44 may have an inlet for water 42 to aid in the scrubbing process. The dissolver offgas scrubber 44 may have two outlets, a first outlet being a scrubbed offgas 46 and a second outlet 92 to a neutralization system 54. The neutralization system 54 may accept flow from the process offgas scrubber 48 as well as for caustic input 58. After neutralization of the materials within the system 54, the system 54 may discharge materials to a building sump 64, for example. Scrubbed offgas 50 exiting the process offgas scrubber 48 may be discharged to the atmosphere.

By utilizing this system, the nitric acid transferring over the solids 24 progressing through the ultrasonic units 26 accumulate uranium. This accumulation of uranium are then treated by the system, thereby allowing the uranium content of the solids 24 to be extracted.

Figure 2:
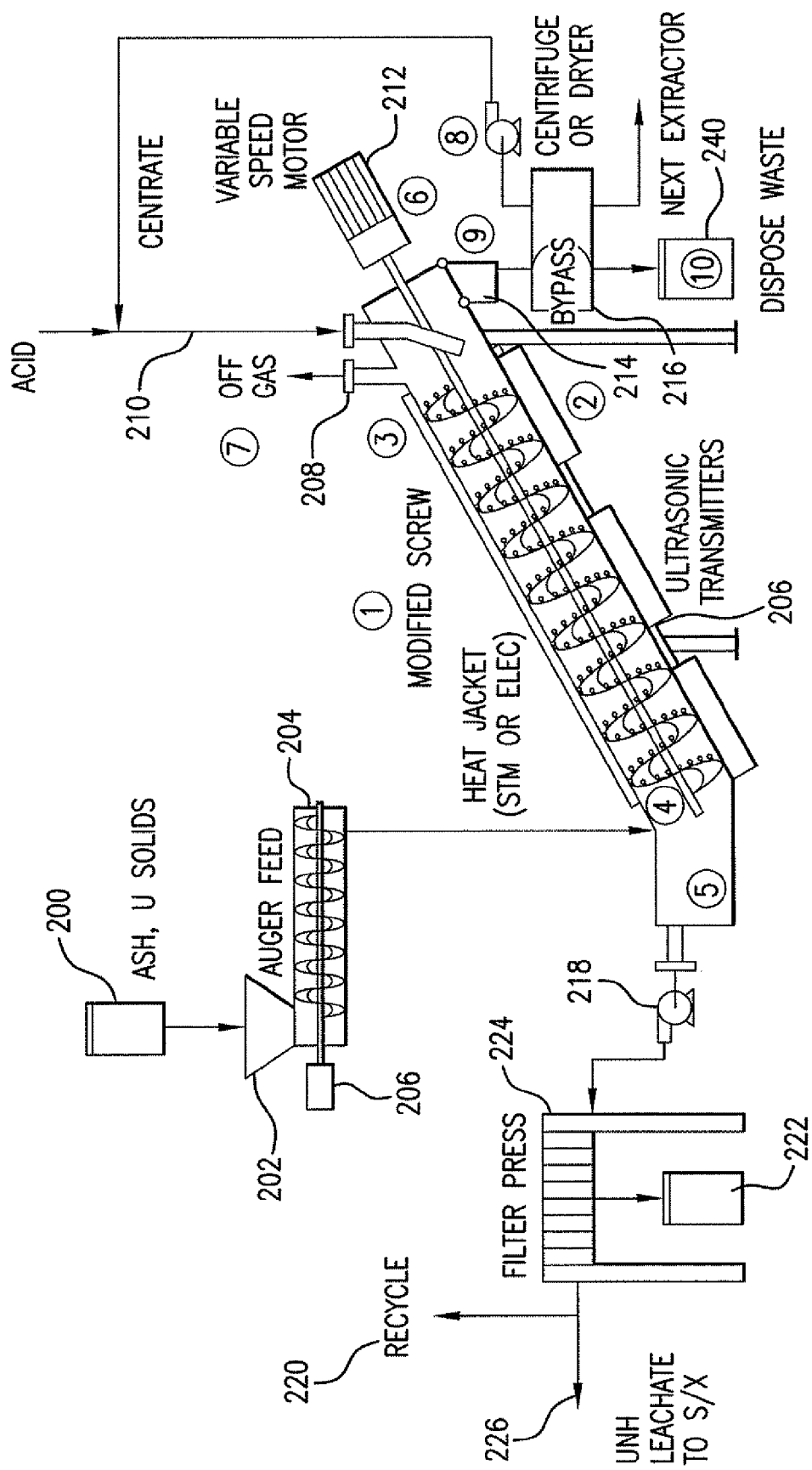
FIG. 2 is an expanded view of the ultrasonic counter-current screw extractor for uranium recovery illustrated in FIG. 1.

Referring to FIG. 2, a single ultrasonic counter-current screw extractor (and associated equipment) is illustrated. Ash and uranium solids 200 may be deposited into a hopper 202 of an auger feed system 204. Although illustrated as an auger feed system, other systems may be used including, but on limited to, mechanical roller and belt-conveyor systems. The auger feed system 204 may have a variable speed motor 206 which allows the feed rate of the system 204 to be varied according to the loading rate of the uranium solids in the hopper 202.

The auger feed system 204 deposits the ash and uranium solids into a base of an ultrasonic counter-current screw extractor 206. The ultrasonic counter-current screw extractor 206 may be a screw feed unit, as a non-limiting example. The jacket of the ultrasonic counter-current screw extractor 206 may be heated, for example, by steam or electricity, to encourage greater removal efficiency of uranium from the solids 200. The ultrasonic counter-current screw extractor 206 may have an offgas outlet 208 to the atmosphere for ventilation purposes. An acid inlet 210 located at the top of the ultrasonic counter-current screw extractor 206 allows for acid to be delivered to the solids 200 to enhance the uranium removal process. The acid inlet 210 may be sized according to the feed rate of the ash and uranium contaminated solids fed into the ultrasonic counter current screw extractor 206 by the auger feed system 204. The speed of transfer of the solids 200 through the ultrasonic counter-current screw extractor 206 may be controlled through a variable speed motor 212. The ultrasonic counter-current screw extractor 206 may have several ultrasonic transmitters, as illustrated in FIG. 2, to provide ultrasonic energy to materials traversing the length of the extractor 206.

Solids exiting the top of the ultrasonic counter-current screw extractor 206 exit through an extractor outlet 214. The extractor outlet 214 may pass through a centrifuge or dryer 216 or may bypass the centrifuge or dryer 216 and enter a disposal system 240.

Nitric acid which has accumulated uranium by passing over the solids 200 transporting through the ultrasonic counter-current screw extractor 206 is transferred by a pump 218 to a filter press system 224. The liquid contents, leachate, may be recycled to other systems 220 or may be recovered by further processing 226. Solid constituents 222 maybe removed by the filter press system 224.

For all ultrasonic counter-current screw extractors illustrated, the mass transfer of uranium from solid mass to a uranium leachate or uranium product is enhanced by ultrasonic energy impartation, counter-current flow, mixing and heat. The applicants have found through experimentation that ultrasonic leaching is proven to be more efficient than static leaching since the mixing energy improves the diffusion rate of uranium into solution. The screw classifier may be equipped with vibrators attached to the bottom of the extractors. The counter-current flow maximizes the uranium concentration gradient by contacting the fresh acid with the lowest uranium solids, and the uranium loaded acid with high uranium bearing solids. The nitric acid flows downward in an opposite direction to the solids, which are propelled upward through the extractor. Solids mixing may be enhanced through small blades attached to the screw of the extractor.

The current invention provides for separation of uranium from solid materials in an economic manner. The system provided can be transportable such that treatment can occur at the site of contamination. The system also reduces labor and energy costs associated with separation of uranium as compared to mechanical separation techniques.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to remove uranium from a body of solid material, comprising:
providing a body of solid material containing a concentration of uranium;
depositing the body of solid material in an ultrasonic extractor;

depositing an amount of acid in the ultrasonic extractor;

heating the ultrasonic extractor with a jacket of the ultrasonic extractor;

transporting the body of solid material to provide a change in height to the body of solid material in the ultrasonic extractor, and flowing the amount of acid in a downward direction opposite that of the body of solid material which is propelled in an upward direction in the ultrasonic extractor, such that the body of solid material and the acid contact each other inside the heated ultrasonic extractor while the ultrasonic extractor provides ultrasonic energy to both the body of solid material and the amount of acid, wherein the amount of acid strips uranium from the body of solid material;

collecting the amount of acid and the body of solid material in the ultrasonic extractor in different positions in the ultrasonic extractor;

transporting the amount of acid with the stripped uranium to an extraction mixer settler; and settling uranium product from the extraction mixer settler.

2. The method according to claim 1, wherein the acid added to the ultrasonic extractor is nitric acid.

3. The method according to claim 1, wherein the body of solid material is incinerator ash.

4. The method according to claim 1, further comprising:

treating the amount of acid with the striped uranium in both an aqueous phase and an organic phase section of the extraction mixer settler.

5. The method according to claim 1, further comprising:

removing gas generated in the ultrasonic extractor and transporting the gas to a dissolver offgas scrubber;

scrubbing offgas from the offgas scrubber, and releasing the offgas to the atmosphere.

* * * * *